US010942928B2

(12) United States Patent
Gordon et al.

(10) Patent No.: US 10,942,928 B2
(45) Date of Patent: Mar. 9, 2021

(54) SYSTEM AND METHOD FOR AUTOMATICALLY PROVIDING ALTERNATIVE POINTS OF VIEW FOR MULTIMEDIA CONTENT

(71) Applicant: International Business Machines Corporation, Armonk, NY (US)

(72) Inventors: Michael S. Gordon, Yorktown Heights, NY (US); James R. Kozloski, New Fairfield, NY (US); Jonathan Lenchner, North Salem, NY (US); Clifford A. Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 207 days.

(21) Appl. No.: 15/822,391

(22) Filed: Nov. 27, 2017

(65) Prior Publication Data

US 2019/0163792 A1    May 30, 2019

(51) Int. Cl.
*G06F 16/2457*    (2019.01)
*G06F 3/0482*    (2013.01)
(Continued)

(52) U.S. Cl.
CPC ........ *G06F 16/2457* (2019.01); *G06F 3/0482* (2013.01); *G06F 16/248* (2019.01); *G06F 16/367* (2019.01); *G06F 40/30* (2020.01)

(58) Field of Classification Search
CPC .. G06F 16/2457; G06F 16/248; G06F 3/0482; G06F 17/2785
See application file for complete search history.

(56) References Cited

U.S. PATENT DOCUMENTS

| 9,020,956 B1 * | 4/2015 | Barr ..................... G06F 16/951 |
| | | 707/748 |
| 9,143,543 B2 | 9/2015 | Falvo |
| (Continued) | | |

FOREIGN PATENT DOCUMENTS

EP    2813983 A1    6/2013

OTHER PUBLICATIONS

Wadhwa, S. et al.; Method and System for Distributed Indexing of Multimedia Content, Jan. 19, 2011.
(Continued)

*Primary Examiner* — Mark D Featherstone
*Assistant Examiner* — Samuel C Sharpless, III
(74) *Attorney, Agent, or Firm* — Garg Law Firm, PLLC; Rakesh Garg; Anthony Curro

(57) ABSTRACT

A selection of content from a content presentation is received. At least one topic from the selected content is extracted using natural language processing (NLP). The at least one topic is representative of a subject conveyed within the selected content. At least one perspective associated with the at least one topic is extracted using NLP. The at least one perspective is representative of a point of view conveyed within the selected content regarding the at least one topic. A topic rating of the extracted topics and associated perspectives is determined based upon the extracted topics and associated perspectives. The topic rating is representative of a topic diversity among the extracted topics and associated perspectives. The topic rating is presented within a graphical user interface (GUI).

20 Claims, 6 Drawing Sheets

(51) Int. Cl.
*G06F 16/248* (2019.01)
*G06F 16/36* (2019.01)
*G06F 40/30* (2020.01)

(56) References Cited

U.S. PATENT DOCUMENTS

| | | | |
|---|---|---|---|
| 9,191,422 B2 | 11/2015 | Tarbox et al. | |
| 9,672,555 B1* | 6/2017 | Dillard | G06Q 30/0282 |
| 9,860,337 B1* | 1/2018 | Brown | G06F 16/954 |
| 2004/0025191 A1* | 2/2004 | McDermott-Walsh | H04N 7/17318 |
| | | | 725/136 |
| 2006/0047701 A1* | 3/2006 | Maybury | G06F 16/9535 |
| 2010/0262454 A1* | 10/2010 | Sommer | G06F 16/355 |
| | | | 706/20 |
| 2013/0218788 A1* | 8/2013 | Terheggen | G06Q 30/018 |
| | | | 705/317 |
| 2014/0372162 A1* | 12/2014 | Dhara | G06Q 10/1095 |
| | | | 705/7.19 |
| 2017/0262447 A1* | 9/2017 | Paulsen | H04L 67/00 |
| 2018/0018316 A1* | 1/2018 | Bogdan | G06F 17/2785 |

OTHER PUBLICATIONS

Yabandeh, M. et al.; A Method and System for Delivering Multimedia Content to a User, Jul. 23, 2013.
Anonymously; Method and System for Automatically Categorizing Multimedia Content Based on Timestamp, May 26, 2011.
Nichols, N. et al.; Machine-Generated Multimedia Content, Second International Conferences on Advances in Computer-Human Interactions;2009.

* cited by examiner

SYSTEM AND METHOD FOR AUTOMATICALLY PROVIDING ALTERNATIVE POINTS OF VIEW FOR MULTIMEDIA CONTENT

TECHNICAL FIELD

The present invention relates generally to a method, system, and computer program product for providing multimedia content. More particularly, the present invention relates to a method, system, and computer program product for automatically providing alternative points of view for multimedia content.

BACKGROUND

The consumption of media such as social media continues to increase at an accelerating rate. Users often wish to engage with media on topics that contain a fair and balanced treatment of a subject, or that, at least, present differing points of view (perspectives) on a subject. For example, a user may wish to be pointed to content (e.g., essays) that give various "sides" of an issue rather than a single perspective, for example a conservative viewpoint versus a liberal viewpoint on a particular subject. Social media sites visited by users often attempt to provide media consistent with particular perceived ideologies and interests. As a result, ideological and interest-based "echo chambers" have been created for users in which a particular user encounters only beliefs or opinions that coincide with the user's own, so that the user's existing views are reinforced, and alternative ideas are not considered. These echo chambers extend beyond politics to science, social science, and also the arts. However, many users would like to escape their echo-chambers and receive a more balanced set of perspectives on different issues and subject matters.

SUMMARY

The illustrative embodiments provide a method, system, and computer program product. An embodiment of a method includes receiving a selection of content from a content presentation. The embodiment further includes extracting, using natural language processing (NLP), at least one topic from the selected content. In the embodiment, the at least one topic is representative of a subject conveyed within the selected content. The embodiment further includes extracting, using NLP, at least one perspective associated with the at least one topic. In the embodiment, the at least one perspective is representative of a point of view conveyed within the selected content regarding the at least one topic. The embodiment further includes determining a topic rating of the extracted topics and associated perspectives based upon the extracted topics and associated perspectives. In the embodiment, the topic rating is representative of a topic diversity among the extracted topics and associated perspectives. The embodiment further includes presenting the topic rating within a graphical user interface (GUI).

Another embodiment further includes searching a content source for complementary content based upon the topic rating to determine one or more complementary content search results for the extracted topics and perspectives, and receiving a selection from among the one or more complementary content search results. Another embodiment further includes presenting the one or more complementary content search results in the GUI, and receiving the selection from among the one or more complementary content search results using the GUI.

Another embodiment further includes retrieving complementary content associated with the selected complementary content search results, and providing the complementary content within the GUI. In another embodiment, the complementary content is presented within the GUI as part of a Web browser plugin. In another embodiment, the complementary content is presented within a pop up window in the GUI. In another embodiment, the complementary content is presented within the GUI as part of an electronic book. In another embodiment, the complementary content is presented within a broadcast. In another embodiment, the complementary content is presented as closed caption information within the broadcast.

In another embodiment, extracting the at least one topic includes representing the at least one topic as a vector in a vector space. In another embodiment, the extracting of the at least one topic includes using one or more of probabilistic latent semantic indexing (PLSI), Latent Dirichlet allocation (LDA), Pachinko allocation, singular value decomposition (SVD), the method of moments, and non-negative matrix factorization (NMF).

In another embodiment, the topic rating is representative of one of an orthogonality, an opposition, and an independence among the extracted topics and associated perspectives. In another embodiment, the GUI is configured to allow a user to select the content from the content presentation. In another embodiment, the extracting of the topic is performed at one or more of a sentence level of content organization and a document level of content organization.

In another embodiment, the GUI includes an electronic calendar application having at least one calendar entry, the GUI allowing selection of the at least one calendar entry, and wherein the complementary content includes at least one of an alternative point of view of a meeting topic associated with the calendar entry, a link to one or more other calendar entries providing a complementary viewpoint. In another embodiment, the other calendar entries are sorted in order of degree of complementarity.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
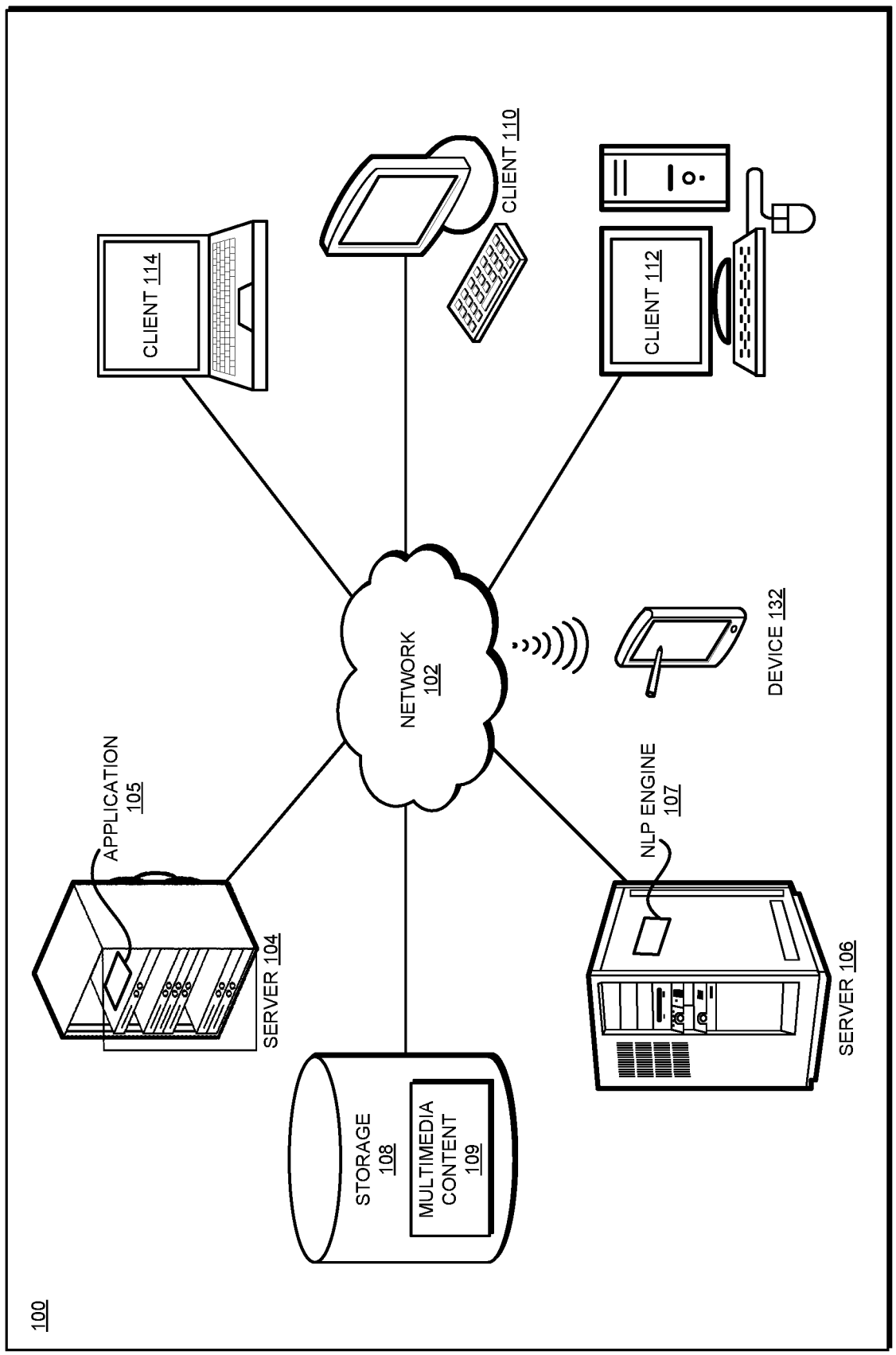
FIG. 1 depicts a block diagram of a network of data processing systems in which illustrative embodiments may be implemented.

The illustrative embodiments recognize that the presently available tools or solutions do not address these needs or provide adequate solutions for these needs. The illustrative embodiments used to describe the invention generally address and solve the above-described problems and other problems related to providing complementary media content including alternative points of view for selected media content.

An embodiment can be implemented as a software application. The application implementing an embodiment can be configured as a modification of an existing media content provider system, as a separate application that operates in conjunction with an existing media content provider system, a standalone application, or some combination thereof.

One or more embodiments are directed to a method and system for presenting multimedia content to a user, detecting and/or extracting topics and points of view (perspectives) in the content, and a providing a rating of topic diversity, for example "orthogonality", independence, or opposition, determined based upon the perspectives to a user. In particular embodiments, the multimedia content may include, for example, text within a Web browser, an essay, a book, an electronic book (eBook), broadcast media such as a television program, vocal output of broadcast commentators, a news story, a blog post, a PowerPoint presentation, a magazine article, or a technical journal papers. In one or more embodiments, the rating of topic diversity is used to search for complementary content and automatically provide access to the complementary content to the user.

As background, note that "a point of view" is a specified or stated manner of consideration, an attitude regarding how one sees or thinks of something, as in "from doctor's point of view". In this meaning, the usage of "point of view" is synonymous with one of the meanings of the term perspective. In machine learning and natural language processing (NLP), a topic model is a type of statistical model for discovering abstract "topics" that occur in a collection of documents in which a topic represents a subject or theme conveyed within content.

Users often wish to engage in topics that contain a fair and balanced treatment of a subject, or at least differing points of views (perspectives) on a subject. For example, a user may wish to be pointed to content (e.g. essays) that provide various "sides" of an issue rather than a single perspective such as solely a conservative or liberal viewpoint on a subject. Providing differing perspectives on a topic is not only useful in the field of education, but people reading or listening to news stories may also welcome this feature for automatically obtaining varied points of view about a particular topic so that a diversity of perspectives regarding a particular topic can be made available to a user.

In one or more embodiments, a perspective associated with a topic is mathematically represented as a vector in a vector space. In vector spaces, diversity can be measured by comparing vectors to each other or by deriving a statistic for an ensemble of vectors. For example, two vectors may be determined to be orthogonal (90 degrees apart) from one another or opposite (180 degrees apart) from one another with respect to a perspective represented by the individual vectors. Ensembles of vectors may be diverse and contain vectors that cover a vector space. In an ensemble of vectors, a useful measure of diversity is a particular vector's statistical independence from the ensemble. Vectors that maximize their independence from the ensemble also maximize the entropy of the ensemble. When the ensemble is a function of some other ensemble, the maximally independent vectors maximize the information about the other ensemble.

In particular embodiments, a system performs topic extraction on multimedia content using one or more of probabilistic latent semantic indexing (PLSI), Latent Dirichlet allocation (LDA), Pachinko allocation, singular value decomposition (SVD), the method of moments, algorithms based upon non-negative matrix factorization (NMF), or any other suitable algorithm or procedure for extracting topics from multimedia content.

In an embodiment, extracting a topic from multimedia content includes representing the multimedia content as a vector in a vector space. In the embodiment, a system or application system compares topic vectors to each other or to an ensemble of topic vectors. In particular embodiments, an application accesses software and/or libraries configured for topic extraction to facilitate the extraction of topics and perspectives from multimedia content.

In one or more embodiments, the application receives a selection of multimedia content from a user, extracts one or more topics and corresponding perspectives from the selected content, determines a topic rating for an extracted topic, searches one or more complementary content sources for complementary content based upon the topic rating, and presents a listing of one or more choices of complementary content (e.g., an alternate point of view) as a suggestion to a consumer (e.g., a user) of the multimedia content within a graphical user interface (GUI) of a client device. In an embodiment, the graphical user interface further includes an indication of the whether the complementary content is orthogonal, opposite, or maximally independent from a given topic or ensemble of topics. In particular embodiments, complementary content (e.g. an alternate point of view) may be suggested to a consumer of content as part of an eBook or as part a broadcast television feature.

In an embodiment, a GUI is provided to allow a user to select sections of a document (e.g. containing assertions) to provide an alternate point of view to the selected content. In a particular embodiment, colors of the GUI buttons may indicate degree of complementarity (or orthogonality) of the respective viewpoint of the complementary content. In another particular embodiment, a user selects a GUI button in a Web browser interface to find and be presented with an alternate point of view for the currently displayed content.

Various embodiments may be directed to different levels of content organization. In one example, a system or application operates at a document level in which a perspective from which a document is written or a video is produced is identified from the content. In another example, the system or application operates at a sentence level in which sentences are identified that strongly express a particular perspective in order to offer a diversity of perspectives.

In a particular usage example, the system or application may employ a machine learning model to identify thesis statements in student essays as a classification task and then present complementary viewpoints to the statements. In another particular usage example, the system or application may be used by authors of newspaper articles or students to aid in end-to-end argument mining in persuasive essays. In another particular usage example, the system or application may be used to find other social networks or bulletin boards that express complementary points of view. In another particular usage example, the system or application may be used by reviewers of content in magazines, technical journals, etc. In another particular usage example, the system or application may be used by debaters, lawmakers, policy makers, politicians, etc. to present alternative viewpoints from their competition.

In one or more embodiments, various visualization choices may be offered as indicators to the diversity of views presented in content, e.g., an article, to the user such as a particular color in text, in a table of contents, etc. In particular embodiments, a GUI may be used to pop up different windows and present display screens (or Web browser windows) showing complementary content. In another particular embodiment, colors of the GUI buttons may indicate degree of complementarity (or orthogonality) of viewpoint.

In another embodiment, the system or application interfaces with a calendar application to enable a GUI to provide a user with complementary content related to a meeting scheduled in the calendar application in response to a selection by the user. In a particular embodiment, the GUI includes a button associated with one or more calendar entries to allow a user to select the button to obtain alternative points of view on a meeting topic associated with the particular meeting corresponding to the calendar entry. For example, a user preparing for a meeting on the topic of the future of blockchain applications may press the button and become better prepared by being provided with complementary content for the topic including alternative points of view (e.g. links to presentations, web pages, articles, etc.). In other particular embodiments, the buttons may also be pressed after a meeting to learn more about a meeting topic of a past meeting. In particular embodiments, input to the system or application may include calendar information for a meeting, an attendee list (and job titles and organizations for which the attendees work), and any attached presentations or links to content associated with a meeting, etc. Calendar entries may include entries for meetings, announcements, presentations on topics, etc. Such GUI buttons on calendars may also provide links to other meetings (past or future) that provide similar or complementary viewpoints. Viewpoints may initially only be estimates based on sparse information, but such information may be updated as meeting information is attached or linked to a calendar entry. Moreover, such GUI buttons on calendars can be used to "show me all meetings" with complementary viewpoints sorted in order of degree of complementarity.

In a Web-based eCommerce usage example, a user may shop for particular content, such as a book or article, on an eCommerce website and be provided with a listing of articles or books with alternative or complementary viewpoints for purchase. In a particular embodiment, GUI buttons may be presented at such eCommerce websites for selecting to purchase the "orthogonal" content items for sale.

In another embodiment, a service is implemented to maintain a large multi-dimensional array of topics, and one or more GUI buttons as described above as based, in part, upon lookups into the array. By way of example, consider an article A about the Spanish exploring South America, and then declaring, "This land belongs to the Spanish Empire!" The Spanish thought the Spanish culture was superior to the indigenous culture. Using a look-up table, an "Alternative perspective" includes one or more articles B on Peru from the point of view of the Incans, describing advanced civilizations, governments, and religions, etc. In another example, candidate articles for B may have certain topics, which are determined from latent semantic indexing and the like. In the embodiment, rules are implemented in the form of: if article A has topics 1, 2, and 3, then it return articles B with topics 4, 5, and 6.

In another embodiment, author diversity is used to determine complementary media content. In particular embodiments, GUI buttons may also take into consideration the author of an article, or host of a show, etc., when known. In such a case, difference of view point might be partially estimated by authorship. For example, if a user is reading a writing by author Noam Chomsky and presses the GUI button, the user may be provided with a writing by Sam Harris on the same topic.

In another embodiment, the determination of complementary media content is performed in association with a closed captioning application. In an example application, a user is watching the evening news on a politically conservative TV channel, and alternative viewpoints are presented as closed caption information in text on the bottom of the screen.

In yet another embodiment, the GUI is used to highlight the topics within a document for which a viewpoint (e.g. conservative or liberal) can be ascertained. In an example usage, a service can be provided to assist students in interpreting an essay or text book.

In still another embodiment, topics are compared to an ensemble of given topics using procedures such as Principal Component Analysis, Singular Value Decomposition (SVD), or Independent Component Analysis (ICA).

In another embodiment, the complementary content (e.g. alternate point of view) is suggested or presented to a consumer of the content as part a Web browser plugin. In one or more embodiments, the complementary content is one of orthogonal to, opposite of, independent from the selected media content. In another embodiment, the complementary content is suggested or presented to a consumer of the selected content as part of an eBook. In still another embodiment, the complementary content is suggested or presented to a consumer of the selected content as part a broadcast (e.g., television) feature.

In another embodiment, a GUI is used to select sections of a document (e.g., sentences containing assertions) to provide an alternate point of view of the selected sections.

In various embodiments, the extracting of topics is performed at a sentence level, a document level, or any other level of content organization. In another embodiment, the system or application pops up windows showing the complementary content that is different from a window showing the selected content.

The manner of providing complementary media content for selected media content is unavailable in the presently available methods. A method of an embodiment described herein, when implemented to execute on a device or data processing system, comprises substantial advancement of the functionality of that device or data processing system in providing complementary media content for selected media content.

The illustrative embodiments are described with respect to certain types of content, content sources, transmissions, topics, ratings, topic and perspective extraction procedures and algorithms, GUIs, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
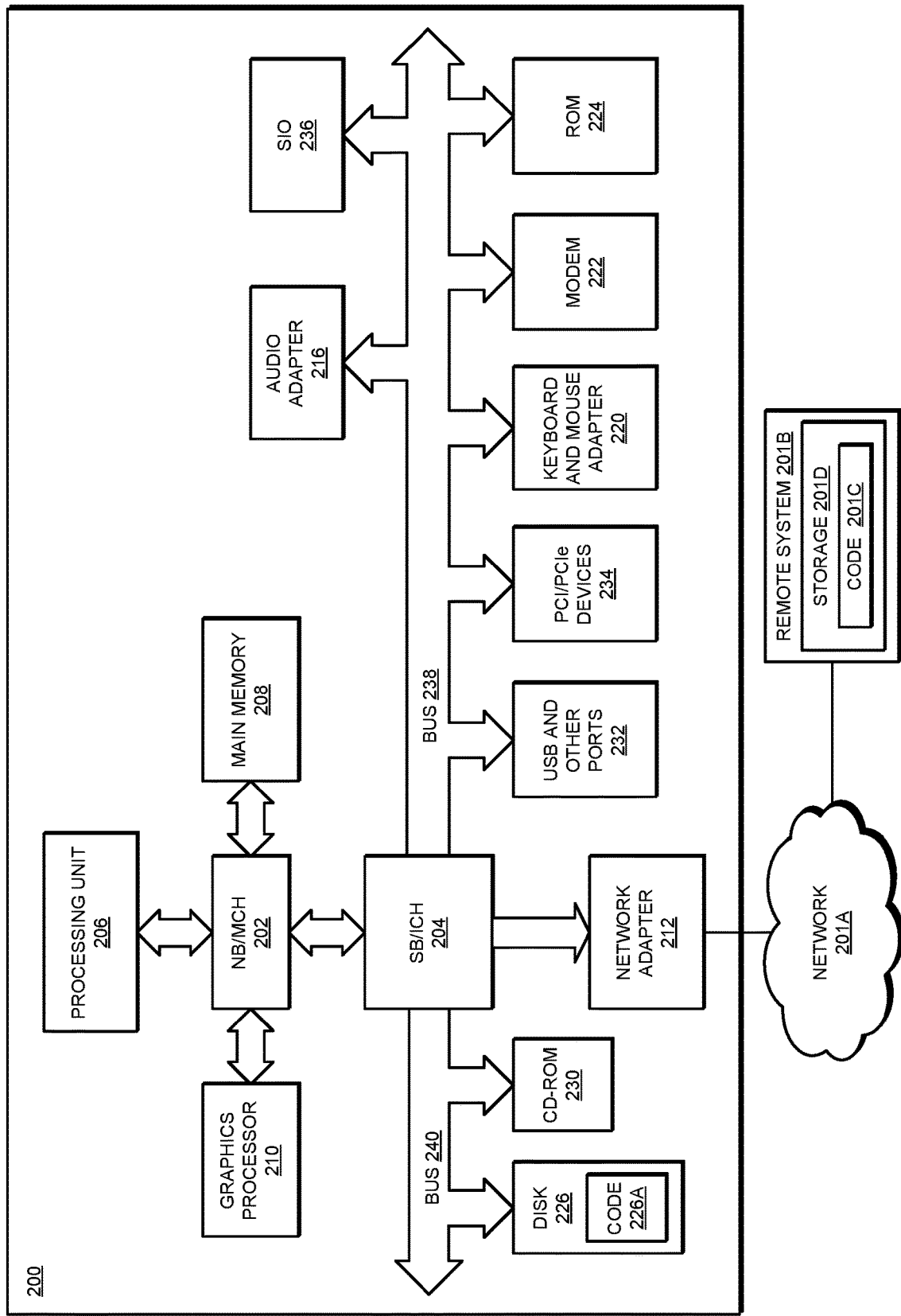
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Server 106 includes a natural language processing engine (NLP) 107 configured to process media content and perform natural language processing on the media content to extract topics and perspectives from the media content. In other embodiments, application 105 may be configured to perform the extracting of topics and perspectives from media content. Multimedia content 109, such as complementary media content, may be stored in storage 108 as shown or supplied by another source (not shown).

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD ROM compact disc read-only memory (CD-ROM) 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro- SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
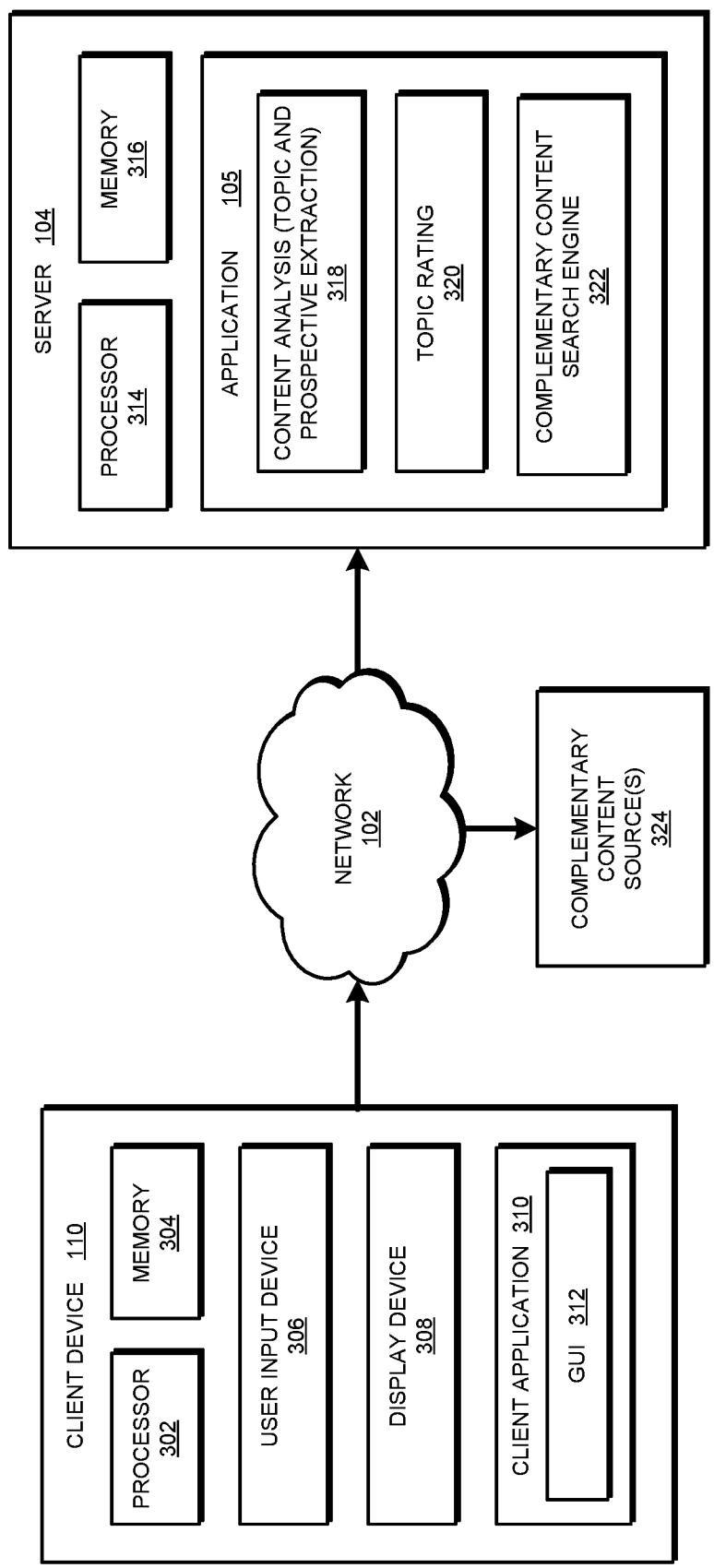
FIG. 3 depicts a block diagram of an example configuration for providing complementary media content for selected media content in accordance with an illustrative embodiment.

With reference to FIG. 3, this figure depicts a block diagram of an example configuration for providing complementary media content for selected media content in accordance with an illustrative embodiment. Client device 110 is an example of client device 110 of FIG. 1 and includes a processor 302, a memory 304, a user input device 306, a display device 308, and a client application 310. Processor 302 is configured to retrieve instructions from memory 304 and execute the instructions to perform various operations of client device 110 as described herein. In one or more embodiments, user input device 306 is configured to provide one or more input devices to allow the user to interact with client device 110. In one or more embodiments, display device 308 is configured to display media content such as complementary media content to a user of client device 110. Client application 310 includes a graphical user interface (GUI) component 312 to allow a user selection of media content, display complementary media content choices to the user, receive a user selection of complementary media content from the display choices from the user, and provide the selected complementary media content to the user.

Server 104 is an example of server 104 of FIG. 1 and includes a processor 314, a memory 316, an application 105. Processor 314 is configured to retrieve instructions from memory 316 and execute the instructions to perform various operations of server 104 as described herein. Application 105 includes a content analysis component 318, a topic rating component 320, and a complementary content search engine component 322. Application 105 is configured to perform the operations associated with providing complementary media content for selected media content as described herein. Content analysis component 318 is configured to receive selected media content and analyze the selected content to extract one or more topics and perspectives from the selected media content as described herein. Topic rating component 320 is configured to determine a topic rating of the extracted topics and associated perspectives including one or more of topic orthogonality, opposition, independence, and diversity. Complementary content search engine component 322 is configured to search one or more complementary content sources 324 based upon the topic rating to determine one or more choices of complementary media content for the extracted topics and perspectives as described herein.

Complementary content source(s) 324 include one or more sources of media content that are complementary to topics and perspectives determined from media content selected by a user. In particular embodiments, one or more of complementary content source(s) 324 include content sources such as document databases, websites, repositories, and other sources of media content.

In one or more embodiments, application 105 is configured to send the one or more choices of complementary media content to client application 310 of client device 110. In the embodiment, client application 310 displays the choices of complementary media content to a user of client device 110 within a list, and receives a selection of one or more of the complementary media content from the user. In the embodiment, client application 310 sends the selection of complementary media content to server 104, and server 104 retrieves the selected complementary media content from complementary content source(s) 324.

Figure 4B:
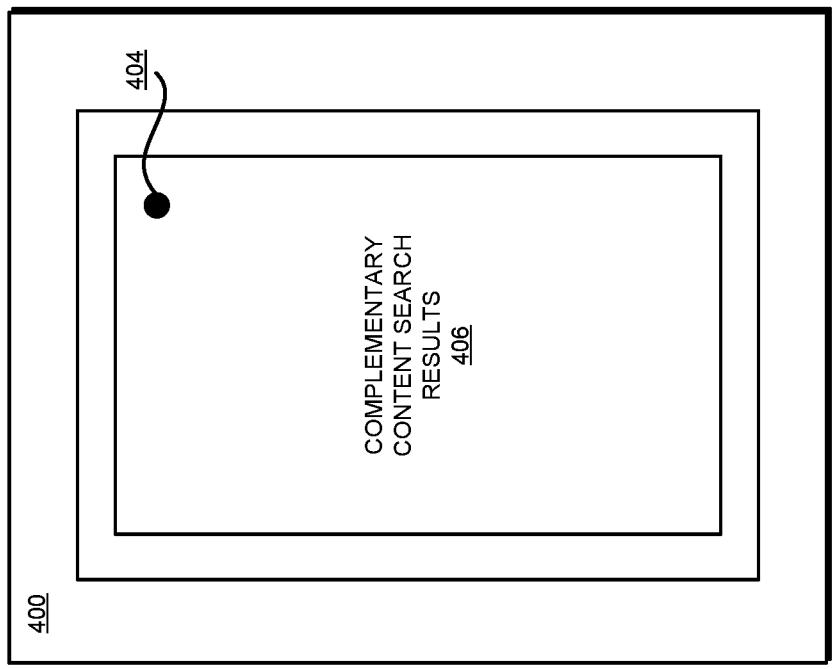
FIGS. 4A-4B depict an example of a web browser based GUI in accordance with an illustrative embodiment.
Figure 4A:
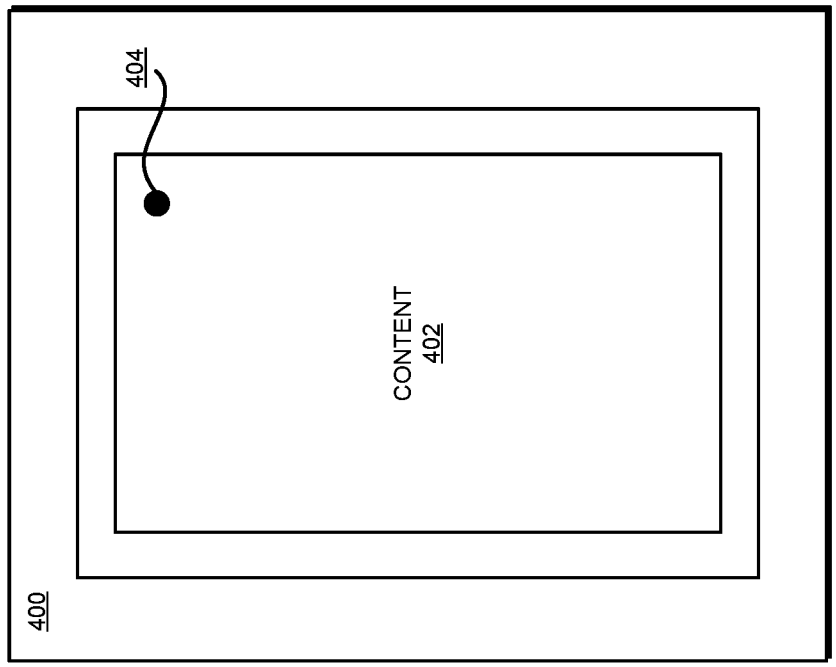

With reference to FIGS. 4A-4B, these figures depict an example of a web browser based GUI 400 in accordance with an illustrative embodiment. With reference to FIG. 4A, this figure depicts GUI 400 including displayed content 402 and a button 404. In the illustrated example, a user viewing content 402 selects button 404 to indicate a desire to view complementary media content for content 402. In the example, client device 110 sends the selected content 402 to server 104. Application 105 extracts topics and perspectives from select content 402, determines a topic rating from the extracted topics and perspectives, searches complementary content source(s) 324 based upon the topic rating to obtain complimentary content search results, and sends the complimentary content search results to client device 110. With reference to FIG. 4B, this figure depicts GUI 400 showing complementary content search results 406 in a list form to allow selection of one or more of the search results by the user. Upon selection of the one or more search results, client device 110 sends the selected search results to server 104. Application 105 retrieves the complementary media content associated with selected search results and provides the complementary media content to client device 110 for display within GUI 400.

Figure 5:
FIG. 5 depicts an example of a calendar application based GUI in accordance with an illustrative embodiment.

With reference to FIG. 5, this figure depicts an example of a calendar application based GUI 500 in accordance with an illustrative embodiment. With reference to FIG. 5, this figure depicts GUI 500 including calendar entries and a button 404 associated with one or more of the calendar entries to allow a user to select button 404 to obtain alternative points of view on a meeting topic associated with the particular meeting corresponding to the calendar entry. For example, a user preparing for a meeting on the topic of the future of blockchain applications may press the button and become better prepared by being provided with complementary content for the topic including alternative points of view (e.g. links to presentations, web pages, articles, etc.). In other particular embodiments, the buttons may also be pressed after a meeting to learn more about a meeting topic of a past meeting.

Figure 6:
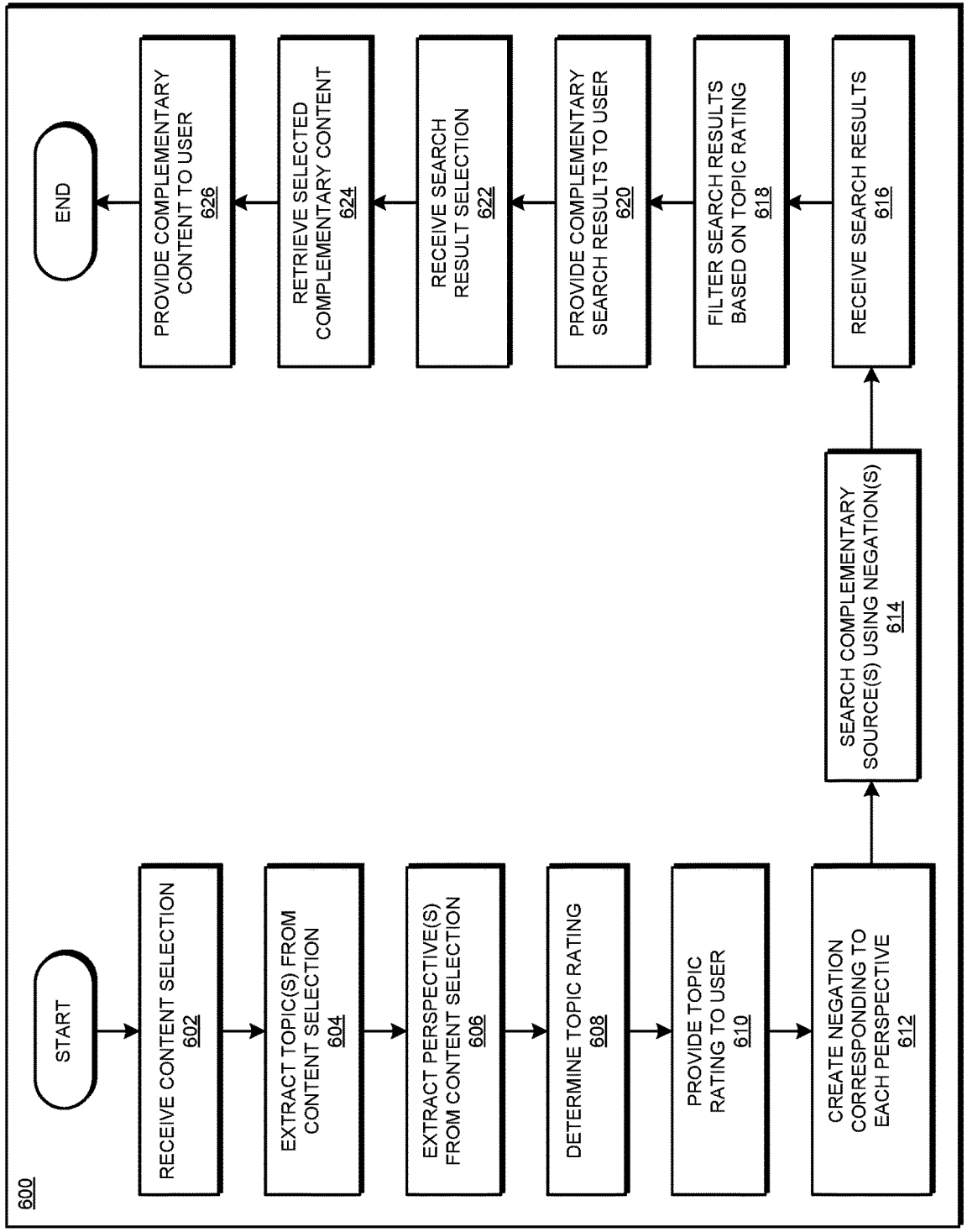
FIG. 6 depicts a flowchart of an example process for providing complementary media content for selected media content in accordance with an illustrative embodiment.

With reference to FIG. 6, this figure depicts a flowchart of an example process 600 for providing complementary media content for selected media content in accordance with an illustrative embodiment. In 602, application 105 of server 104 receives a content selection from a user of client device 110 of a content presentation in which the content selection includes media content for which the user desires to receive complementary media content. In 604, application 105 extracts one or more salient topics $\{T_1, \ldots, T_N\}$ from the selected media content. In one or more embodiments, the extracted topic is representative of a subject conveyed within the selected content.

In particular embodiments, the extraction of topics from the selected content includes transforming the topics into vector representations in a vector space. In particular embodiments, the topic extraction is performed by one or more of probabilistic latent semantic indexing (PLSI), Latent Dirichlet allocation (LDA), Pachinko allocation, singular value decomposition (SVD), the method of moments, algorithms based upon non-negative matrix factorization (NMF), or any other known algorithm or procedure for extracting topics from multimedia content.

In block 606, application 105 extracts one or more perspectives associated with each topic from the selected content. In one or more embodiments, a particular perspective is representative of a point of view conveyed within the selected content regarding the topic. In a particular embodiment, application 105 divides up sentences from the selected content containing statements of point of view or asserted fact from the content are divided up and associates the sentences, to the extent possible, with a particular topic Ti. In particular embodiments, statements that are not strongly associated with any topic determined from the content are discarded. In other particular embodiments, one or more sentences may be associated with more than one topic. For those sentences associated with at least one topic, application 105 extracts what are determined to be statements of opinion and as well as statements of asserted fact since "statements of fact" may also be a matter of disagreement such as in the political realm. In particular embodiments, detecting of assertions of fact and assertions of opinion are determined using natural language processing (NLP) such as described in U.S. Pat. No. 9,483,582. In one or more embodiments, the statements of facts and statements of opinion form one or more perspectives for the topic conveyed by the selected content.

In 608, application 105 determines a topic rating of the extracted topics and associated perspectives including a topic diversity of extracted topics such as one or more of orthogonality, opposition, and independence, based upon the extracted topics and perspectives. In 610, application 105 provides the topic rating to the user. In a particular embodiment, providing the topic rating to the user includes presenting the topic rating within a GUI.

In 612, application 105 creates a negation corresponding to each perspective representing a complementary point of view to the particular perspective. In particular embodiments, a statement of fact or opinion, and the associated negation, are really equivalence classes of statements, all of which convey to the same thing. Thus, a key component is to find the classes in each article and determine, for each class, how numerous the positive assertions are compared with the negative assertions. If there is a noticeable difference then it can be stated with some confidence that for topic Ti, the content (e.g., an article) represents the assertion of fact/opinion $A_j$.

The collection of all such $\{A_j\}$ for the given topic is somewhat representative of the article's stance on topic $T_i$. A second article will take on opposing views to the extent that, for each given $T_i$, it represents $\{\sim A_j\}$ for all j where $\sim A_j$ denotes "not $A_j$".

The degree to which another article disagrees with the present article for a given topic $T_i$ can be established based on how many of the assertions $A_j$ from the first article show up in the form $\sim A_j$ in the other article. This provides a simple measure of the degree to which one article disagrees with another on a given topic. If, on the other hand, one is looking for the degree of disagreement across all topics, then the disagreement score can either be averaged across topics, or a weighted average of the disagreement scores can be taken, considering the degree of importance the given topic is to the article in question.

In 614, application 105 searches one or more complementary media sources using the negations to determine search results identifying complementary media content to the selected media content. In 616, application 105 receives the search results of the complementary media sources. In 618, application 105 filters the search results based on the topic rating. In 620, application 105 provides the complementary search results to the user 620. In 622, application 105 receives a search result selection from the user selection one or more of the complementary media sources. In 624, application 105 retrieves the selected complementary media content from the complementary media content source(s). In 626, application 105 provides the complimentary media content to the user via the client device. The procedure 600 then ends.

Thus, a computer implemented method, system or apparatus, and computer program product are provided in the illustrative embodiments for providing complementary media content for selected media content and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   receiving a selection of content from a content presentation;
   extracting, using natural language processing (NLP), a plurality of topics from the selected content, the topics representative of respective subjects conveyed within the selected content;
   extracting, using NLP, a plurality of perspectives comprising at least one perspective associated with each topic, the perspectives representative of respective points of view conveyed within the selected content regarding the associated topic, the perspectives comprising respective sentences from the selection of content,
   wherein the extracting comprises dividing the content into sentences, discarding sentences not associated with any of the plurality of topics, and, for each remaining sentence, associating the sentence with one of the plurality of topics and detecting a perspective for the associated topic conveyed by the sentence;

determining a topic rating of the extracted topics and associated perspectives based upon the extracted topics and associated perspectives, the topic rating representative of a topic diversity among the extracted topics and associated perspectives, wherein the determining of the topic rating includes measuring the topic diversity by representing the sentences of the respective perspectives in vector space as an ensemble of respective vectors and comparing the vectors to each other, the comparing including detecting orthogonality and independence among pairs of the vectors;

presenting the topic rating within a graphical user interface (GUI);

creating a negation associated with a particular perspective of the plurality of perspectives associated with a particular topic of the plurality of topics, the negation representing an opposing point of view that is complementary to the particular perspective;

searching a content source for complementary content based at least in part on the negation to determine a complementary content search result for the particular perspective;

generating a disagreement score representative of an extent to which the selected content disagrees with the complementary content search result for the particular topic; and presenting the complementary content search result within the GUI.

2. The method of claim 1, further comprising:
detecting a degree of orthogonality between the particular perspective and the complementary content search result.

3. The method of claim 2, further comprising:
presenting the complementary content search result in the GUI, wherein a color of the complementary content search result is indicative of the degree of orthogonality between the particular perspective and the complementary content search result.

4. The method of claim 1 wherein the searching of the content source for complementary content further comprises searching to determine a plurality of complementary content search results, including said complementary content search result, for the particular perspective;
detecting a respective degree of orthogonality between the particular perspective and each of the plurality of complementary content search results;
presenting the complementary content search results in the GUI, wherein a color of each of the complementary content search results is indicative of the respective detected degree of orthogonality;
receiving a selection from among the plurality of complementary content search results;
retrieving complementary content associated with the selection from among the complementary content search results; and
providing the complementary content within the GUI.

5. The method of claim 4, wherein the complementary content is presented within the GUI as part of a Web browser plugin.

6. The method of claim 4, wherein the complementary content is presented as closed caption information within a broadcast.

7. The method of claim 1, wherein extracting the at least one topic includes representing the at least one topic as a vector in a vector space.

8. The method of claim 1, wherein the extracting of the at least one topic includes using one or more of probabilistic latent semantic indexing (PLSI), Latent Dirichlet allocation (LDA), Pachinko allocation, singular value decomposition (SVD), method of moments, and non-negative matrix factorization (NMF).

9. The method of claim 1, wherein the GUI is configured to allow a user to select the content from the content presentation.

10. The method of claim 1, wherein the extracting of the topic is performed at one or more of a sentence level of content organization and a document level of content organization.

11. The method of claim 2, wherein the GUI includes an electronic calendar application having at least one calendar entry, the GUI allowing selection of the at least one calendar entry, and wherein the complementary content includes at least one of an alternative point of view of a meeting topic associated with the calendar entry, a link to one or more other calendar entries providing a complementary viewpoint.

12. The method of claim 11, wherein the other calendar entries are sorted in order of degree of complementarity.

13. A computer usable program product comprising one or more computer-readable storage medium, and program instructions stored on at least one of the one or more storage medium, the stored program instructions comprising:
program instructions to receive a selection of content from a content presentation;
program instructions to extract, using natural language processing (NLP), a plurality of topics from the selected content, the topics representative of respective subjects conveyed within the selected content;
program instructions to extract, using NLP, a plurality of perspectives comprising at least one perspective associated with each topic, the perspectives representative of respective points of view conveyed within the selected content regarding the associated topic, the perspectives comprising respective sentences from the selection of content,
wherein the program instructions to extract comprise instructions to divide the content into sentences, program instructions to discard sentences not associated with any of the plurality of topics, and, for each remaining sentence, program instructions to associate the sentence with one of the plurality of topics and detect a perspective for the associated topic conveyed by the sentence;
program instructions to determine a topic rating of the extracted topics and associated perspectives based upon the extracted topics and associated perspectives, the topic rating representative of a topic diversity among the extracted topics and associated perspectives,
wherein the determining of the topic rating includes measuring the topic diversity by representing the sentences of the respective perspectives in vector space as an ensemble of respective vectors and comparing the vectors to each other, the comparing including detecting orthogonality and independence among pairs of the vectors;
program instructions to present the topic rating within a graphical user interface (GUI);
program instructions to create a negation associated with a particular perspective of the plurality of perspectives associated with a particular topic of the plurality of topics, the negation representing an opposing point of view that is complementary to the particular perspective;

program instructions to search a content source for complementary content based at least in part on the negation to determine a complementary content search result for the particular perspective;

program instructions to generate a disagreement score representative of an extent to which the selected content disagrees with the complementary content search result for the particular topic; and program instructions to present the complementary content search result within the GUI.

14. The computer usable program product of claim 13, further comprising:

program instructions to search a content source for complementary content based upon the topic rating to determine one or more complementary content search results for the extracted topics and perspectives; and program instructions to receive a selection from among the one or more complementary content search results.

15. The computer usable program product of claim 14, further comprising:

program instructions to retrieve complementary content associated with the selected complementary content search results; and program instructions to provide the complementary content within the GUI.

16. A computer system comprising one or more processors, one or more computer-readable memories, and one or more computer-readable storage medium, and program instructions stored on at least one of the one or more storage medium, for execution by at least one of the one or more processors via at least one of the one or more memories, the stored program instructions comprising:

program instructions to receive a selection of content from a content presentation;

program instructions to extract, using natural language processing (NLP), at least one topic from the selected content, the at least one topic representative of a subject conveyed within the selected content;

program instructions to extract, using NLP, a plurality of perspectives comprising at least one perspective associated with each topic, the perspectives representative of respective points of view conveyed within the selected content regarding the associated topic, the perspectives comprising respective sentences from the selection of content, wherein the instructions to extract comprise instructions to divide the content into sentences, instructions to discard sentences not associated with any of the plurality of topics, and, for each remaining sentence, instructions to associate the sentence with one of the plurality of topics and detect a perspective for the associated topic conveyed by the sentence;

program instructions to determine a topic rating of the extracted topics and associated perspectives based upon the extracted topics and associated perspectives, the topic rating representative of a topic diversity among the extracted topics and associated perspectives, wherein the determining of the topic rating includes measuring the topic diversity by representing the sentences of the respective perspectives in vector space as an ensemble of respective vectors and comparing the vectors to each other, the comparing including detecting orthogonality and independence among pairs of the vectors;

program instructions to present the topic rating within a graphical user interface (GUI);

program instructions to create a negation associated with a particular perspective of the plurality of perspectives associated with a particular topic of the plurality of topics, the negation representing an opposing point of view that is complementary to the particular perspective;

program instructions to search a content source for complementary content based at least in part on the negation to determine a complementary content search result for the particular perspective;

program instructions to generate a disagreement score representative of an extent to which the selected content disagrees with the complementary content search result for the particular topic; and program instructions to present the complementary content search result within the GUI.

17. The method of claim 1, further comprising:

determining assertions of opinion associated with the particular topic in the selected content; and determining assertions of fact associated with the particular topic in the selected content.

18. The method of claim 17, further comprising:

determining opposing assertions of opinion associated with the particular topic in the complementary content search result; and determining opposing assertions of fact associated with the particular topic in the complementary content search result.

19. The method of claim 18, wherein the disagreement score is based at least in part on a first total number of assertions associated with the particular topic in the selected content and a second total number of opposing assertions associated with the particular topic in the complementary content search result.

20. The method of claim 19, wherein the first total number of assertions includes the assertions of opinion and the assertions of fact, and wherein the second total number of opposing assertions includes the opposing assertions of opinion and the opposing assertions of fact.

* * * * *